March 5, 1946. W. J. MEANS ET AL 2,396,187

ELECTRIC RECORDER

Filed Sept. 29, 1939 2 Sheets-Sheet 1

INVENTORS: W. J. MEANS
T. SLONCZEWSKI

BY

ATTORNEY

March 5, 1946.   W. J. MEANS ET AL   2,396,187
ELECTRIC RECORDER
Filed Sept. 29, 1939   2 Sheets-Sheet 2

INVENTORS: W. J. MEANS
T. SLONCZEWSKI
BY
ATTORNEY

Patented Mar. 5, 1946

2,396,187

UNITED STATES PATENT OFFICE 2,396,187

ELECTRIC RECORDER

Winthrop J. Means, Ridgewood, N. J., and Thaddeus Slonczewski, Glen Head, N. Y., assignors to Bell Telephone Laboratories, Incorporated, New York, N. Y., a corporation of New York Application September 29, 1939, Serial No. 297,088

10 Claims. (Cl. 172—239)

This invention relates to electric recorders and more particularly to control systems for recorders adapted for high speed response to rapid changes in the magnitude of the condition to be recorded.

The principal stumbling block to the design of a rapid response recorder is instability which results in overshooting whereby false recordings are made. It has been recognized that stability is attained only when the control system gradually ceases to drive the recorder element as balance is approached. Heretofore some control systems have been developed wherein the torque is large for large departures from balance and approaches zero as balance is approached. Broadly, this is recognized as the general condition for simple harmonic motion and is therefore diametrically opposed to stability. Stability is attained, however, where the control system effectively controls the speed of rebalance as a monotonically increasing function of the departure from balance. To emphasize, it is only when the speed of rebalance is controlled that stability is attained since mere torque control tends to result only in instability and overshooting. Speed of response, on the other hand, is increased only by increasing the ratio of driving torque to inertia.

It is, therefore, the object of this invention to provide a simplified control system wherein mechanical inertia effects are greatly reduced, resulting in an increased speed of response with improved stability and reliability.

The foregoing object is attained by providing a recorder comprising a normally balanced electrical network, means for unbalancing the network, a lightweight recording element driven by a small, low inertia electromechanical motive means and an electronic speed control therefor adapted to control the speed of response as a monotonically increasing function of the departure from balance.

This invention is more particularly described in the following specification taken in connection with the accompanying drawings, wherein:

Fig. 1 discloses a preferred embodiment of the control circuits of this invention wherein two motor armatures on a common shaft comprise the motive means;

Fig. 2 discloses a slight modification of Fig. 1 wherein only one armature is employed in place of two;

Figure 1:
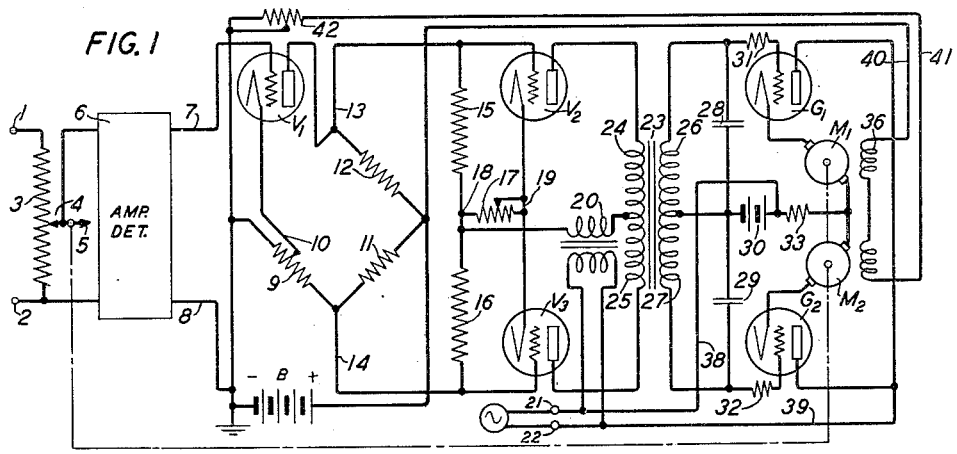

Referring now to Fig. 1 wherein the complete control circuits of a recorder system in accordance with this invention are disclosed, reference numerals 1 and 2 denote terminals of a variable attenuator 3, preferably in the form of a simple potentiometer, having a slider 4. If the condition to be recorded is a voltage, terminals 1 and 2 may connect directly thereto. If, however, the condition is a non-electrical physical phenomenon it is connected thereto via a suitable electrical transducer as shown schematically in Fig. 8 which is adapted to convert the magnitude and direction of said phenomenon into a corresponding electrical voltage. Integrally associated with the slider 4 is a recording stylus 5 adapted to record the movements of slider 4 on a suitable chart. The lower terminal 2 of attenuator 3 and the slider 4 are connected to the input of an amplifier-detector 6. The direct current output of this amplifier-detector is connected via conductors 7 and 8 to the variable impedance branch of a normally balanced electrical network. In this case the variable impedance is in the form of a vacuum tube triode $V_1$. Potentiometer 9 and resistors 11 and 12 comprise the remaining branches of the normally balanced network. The cathode heater circuit for tube $V_1$ as well as for the remaining tubes in this and the other circuits of this invention are not shown, since such circuits are well known in the electronic art and need no further description. A direct current source B+ and B— furnishes the necessary supply voltage for this normally balanced network including the space current voltage for tube $V_1$. Normal bias and control thereover for the grid of tube $V_1$ is supplied by the amplifier-detector 6 in a manner well known in the art. The output of the normally balanced network is connected to the grids of vacuum tubes $V_2$ and $V_3$ via conductors 13 and 14. Vacuum tubes $V_2$ and $V_3$ preferably, but not necessarily, have identical characteristics. To simplify the description, however, they will be assumed identical. Equal resistors 15 and 16 are serially connected between conductors 13 and 14. The cathodes of tubes $V_2$ and $V_3$ are connected together by conductor 19 and a self-bias rheostat 17, common to both tubes, is connected between conductor 19 and the junction 18 between resistors 15 and 16. The plates of tubes $V_2$ and $V_3$ are connected together through the primary 24, 25 of a transformer 23. Both the primary and the secondary of transformer 23 are center tapped and the center tap connection of primary 24, 25 is connected through a transformer 20 to junction 18 between resistors 15 and 16. The primary of transformer 20 is supplied from an ordinary source of alternating current, for example 60 cycles, 110 volts, by way of terminals 21 and 22.

It will be evident from the foregoing description that so long as the network 9, $V_1$, 11, 12 remains balanced, the alternating current output of transformer 20 will be equally divided between the two halves of the primary of transformer 23 and by properly phasing the connections of these windings with respect to the secondary windings 26, 27, transformer 23 will deliver no output. As soon, however, as the normally balanced network is unbalanced it will deliver an output through conductors 13 and 14 and resistors 15 and 16 which will, in turn, destroy the balance between vacuum tubes $V_2$ and $V_3$ thereby rendering the division of alternating current between primary windings 24 and 25 unequal. Transformer 23 will thereupon deliver an alternating current output in its secondary windings 26 and 27, the magnitude and direction whereof will be controlled by the magnitude and the direction of the departure from balance.

Condensers 28 and 29 shunt secondary windings 26 and 27 of transformer 23 and serve to filter out all the harmonics of the fundamental frequency. This is accomplished by proportioning the capacities of these two condensers so that they form a tuned circuit with the transformer windings, resonant at the fundamental frequency. The outer terminals of windings 26 and 27 are connected to the grids of gas tubes $G_1$ and $G_2$ by way of resistors 31 and 32, respectively. The cathodes of these two gas tubes are connected together through the armatures of motors $M_1$ and $M_2$. A resistor 33, common to the input and output circuits of both tubes $G_1$ and $G_2$, is connected between the junction of the two armatures and the center tap between windings 26 and 27 by way of bias battery 30. While the normal direct current bias source for gas tubes $G_1$ and $G_2$ is herein disclosed in the form of a battery 30 it is obvious to any one skilled in the art that this bias may be obtained by other means already well known in the electronic art. The plates of these two tubes are joined together and are connected directly to the alternating current supply terminal 22 by way of conductor 39. The return circuit from the cathode of these two tubes is by way of the motor armatures, resistor 33, conductor 38 to supply line 21. Armatures $M_1$ and $M_2$ are either mounted on a common shaft or have their individual shafts coupled together. These motors are small direct current machines and their fields 36 are separately excited by way of conductors 40 and 41 from direct current power supply B+ and B—. A rheostat 42 is provided in line 41 for adjusting the intensity of the field. A mechanical linkage between these armatures and the slider 4 of attenuator 3 is schematically indicated by means of a dotted line. Two specific forms of suitable mechanical linkages will be described later in connection with Figs. 3 and 4.

The above-described control system operates as follows: Network $V_1$, 9, 11, 12 is adjusted to normal balance for a given input voltage at terminals 1, 2 of attenuator 3 which corresponds to a given position of slider 4 and adjustment of amplifier-detector 6. It is evident that after having once made these adjustments any change in voltage level at terminals 1 and 2 may be compensated for by adjusting slider 4 on attenuator 3 until the voltage input therefrom to amplifier-detector 6 is the same as it was for the original balanced state. This brings the output of amplifier-detector 6 back to its original balanced state and therefore any non-linearity inherent in its characteristics does not affect the accuracy of the recording. The control circuit, the functions of which are more particularly hereinafter described, serves to cause motors $M_1$ and $M_2$ to quickly readjust the position of slider 4 upon any change of voltage level at terminals 1 and 2.

Assume, for example, an instantaneous shift of potential at terminals 1 and 2. This will cause a substantially instantaneous shift in impedance for variable impedance element $V_1$ and a consequent immediate unbalance for the normally balanced network. It will here be noted that the direction of unbalance and the magnitude thereof will be determined by the direction and the magnitude of the change of voltage at terminals 1 and 2. Assume again, for example, that this sudden departure from balance is such as to cause a positive flow of current from conductor 13 through resistors 15 and 16 to conductor 14. This will cause the grid of vacuum tube $V_2$ to increase in voltage while the grid of vacuum tube $V_3$ correspondingly decreases in voltage, whereupon transformer primary winding 24 begins to carry a greater proportion of the alternating current component from transformer 20 than does winding 25. This will result in an immediate transfer of alternating current energy to secondary windings 26 and 27. All the harmonics above the fundamental inherently introduced into the secondary windings by such a circuit are filtered by condensers 28 and 29, leaving a substantially pure sinusoidal alternating current voltage of fundamental frequency between the outer terminals of windings 26 and 27. Gas tubes $G_1$ and $G_2$ are normally biased to cut-off by means of bias battery 30. In fact, battery 30 is adjusted to slightly overbias these tubes so as to allow a slight margin to aid in maintaining stability. Assume that the phase relationships in the alternating current circuits just described are such that the alternating current voltage across windings 26 and 27 causes the voltage of the grid of tube $G_1$ to increase in the positive direction beyond its critical control point and the grid of $G_2$ to be more negative at the same instant that both plates are positive. It will be apparent under these conditions that only tube $G_1$ will fire since the grid of tube $G_2$ is 180 degrees out of phase with the voltage on its plate. So long as the normally balanced network remains unbalanced, as above described, tube $G_1$ will continue to fire on every positive half cycle. Each time tube $G_1$ fires, a positive pulse of current will flow from line 22 by way of line 39 to the plate of tube $G_1$, thence to the cathode, through armature $M_1$ and back to line 21 by way of resistor 33 and line 38. Motor $M_1$ will very rapidly increase in speed, the actual final speed which it attains depending upon the amount of departure from balance. This may be more clearly understood by referring to Fig. 6 which shows the essential parts of this portion of the motor control circuit.

Figure 6:
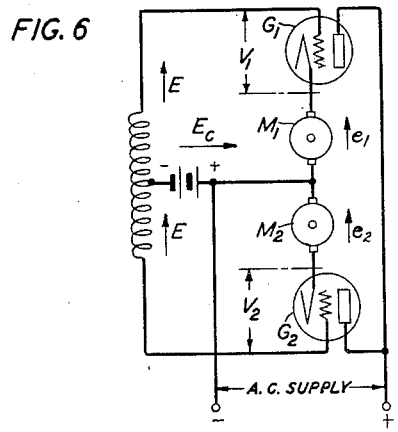
Figs. 6 and 7 show more in detail portions of the motor control circuits of Figs. 1 and 2, respectively.

In Fig. 6 the arrows indicate the instantaneous directions of voltage at the instant that the plates of tubes $G_1$ and $G_2$ are positive. From a study of the previously described circuit conditions it will be clear that the voltages E appearing across windings 26 and 27, respectively, will depend for their magnitude and direction upon the amount and direction of shift in voltage at the input terminals of the amplifier 6 of Fig. 1. Stated otherwise, the magnitude and direction of these voltages will depend upon the degree and direction of unbalance of the normally balanced network $V_1$, 9, 11 and 12. Since after a gas tube fires the grids lose control thereover these circuits will be analyzed for the control conditions existing just prior to firing.

So long as tube $G_1$ is repeatedly firing, motor $M_1$ is receiving impulses from the positive half cycles of current flowing therethrough and is thereby intermittently accelerated. During each interval when tube $G_1$ is non-conductive, motor $M_1$ is coasting at a substantially uniform speed and is thereby producing a counter-E. M. F. $e_1$ which is proportional to the speed of the motor. Since motor $M_2$ is rotating at the same speed as $M_1$ and is structurally substantially identical thereto it too will generate a voltage $e_2$ equal to voltage $e_1$, the purpose of which will be hereinafter disclosed. During each non-conductive period of tube $G_1$ the grid thereof, if of proper voltage, may regain control. The actual bias voltage $V_1$ appearing at the grid of tube $G_1$ during its non-conductive period may be expressed mathematically as follows:

$$V_1 = E - (E_c + e_1) \quad (1)$$

where:

$V_1$=bias voltage for tube $G_1$
$E$=voltage on winding 26
$E_c$=fixed bias voltage for tubes $G_1$ and $G_2$
$e_1$=counter-E. M. F. of $M_1$.

An examination of Equation 1 will disclose that so long as voltage $E$ is large enough to cause the bias voltage $V_1$ to be at or above the critical grid voltage, tube $G_1$ will repeatedly discharge on positive half cycles of alternating current and motor $M_1$ will continue to be accelerated. Now if the mechanical linkage shown in Fig. 1 were removed so that the movement of motor $M_1$ does not rebalance the now unbalanced network, voltage $E$ will remain a fixed quantity for a given shift in voltage at terminals 1 and 2 of Fig. 1. It will be apparent under these conditions that motor $M_1$ will continue to rapidly accelerate until its back E. M. F. $e_1$ is large enough to reduce the bias voltage $V_1$ to maintain tube $G_1$ non-conductive. This will occur, assuming $E_c$ is adjusted to slightly overbias tubes $G_1$ and $G_2$ as previously described, when $e_1$ is only slightly less than, or greater than, $E$. Under these conditions, assuming no friction or other energy losses, motor $M_1$ will continue to coast at a uniform speed.

A similar consideration for the biased conditions on tube $G_2$ yields the following mathematical expression:

$$V_2 = -E - (E_c - e_2) \quad (2)$$

where:

$V_2$=bias voltage for tube $G_1$
$e_2$=counter-E. M. F. of $M_2$
$E$ and $E_c$ are as previously defined.

In Equation 2 above it is apparent that tube $G_2$ cannot fire under the conditions assumed. Suppose, however, that the motors are still running at the uniform speed assumed above and voltage $E$ is slightly lowered either by shifting the voltage on terminals 1 and 2 of Fig. 1 or by operating the slider 4 on attenuator 3. Under such circumstances the counter-E. M. F. $e_2$ will then be large enough, due to the reduction of voltage $E$, to cause tube $G_2$ to fire on positive half cycles of alternating current. This will cause motor $M_2$ to rapidly decelerate until it assumes a speed such that its counter-E. M. F. $e_2$ would no longer cause tube $G_2$ to fire, that is, until $e_2$ equals $E$.

Now assume that the mechanical linkage between the motor and slider 4 of Fig. 1 is again connected. It will be seen that the motors will rapidly shift the position of the slider towards the position of rebalance and during this transition period the alternate firing of tubes $G_1$ and $G_2$ will be such as to keep the speed of the motors rapidly decreasing as balance is approached.

It should be here noted that the actual speed of the motors is not necessarily a linear function of the degree of departure from balance. As a matter of fact, for the circuits herein disclosed it will be anything but linear. It is more accurately expressed as being a monotonically increasing function of the departure from balance. The important thing to note, however, is that as the condition of balance is approached the speed of the motor is rapidly brought to zero. This insures a high degree of stability and with the inertia of the mechanical parts kept at a minimum the speed of response is very high. It has been found by actual construction that the coasting period between alternate firings of tubes $G_1$ and $G_2$ can be made very short, resulting in very close speed control and freedom from overshooting.

That the speed of the motors $M_1$ and $M_2$ is directly proportional to the voltage $E$ may be shown mathematically by remembering that the counter-E. M. F.'s $e_1$ and $e_2$ are proportional to the speed of rotation so that:

$$e_1 = e_2 = K\omega \quad (3)$$

where:

$K$=a constant
$\omega$=angular velocity of $M_1$ and $M_2$.

Then substituting $K\omega$ for $e_1$ and $e_2$ in Equations 1 and 2 the following expressions are obtained:

$$V_1 = E - (E_c + K\omega) \quad (4)$$
$$V_2 = -E - (E_c - K\omega) \quad (5)$$

As a preliminary adjustment voltage $E$ is made zero and $E_c$ is adjusted to very slightly overbias both tubes when the motor armatures are stationary, whereupon both $E$ and $\omega$ are zero and $V_1 = -E_c = V_2$. Then if either $-V_1$ is substituted in Equation 4 for $E_c$ or $-V_2$ is substituted in Equation 5 for $E_c$ the following expression is obtained:

$$\omega = E/K \quad (6)$$

Equation 6 expresses the speed of the motors as always proportional to voltage $E$ and since voltage $E$ is a monotonically increasing function of the departure from balance, so also is the motor speed. It should be remembered that the above expressions are predicated upon the ability of the mechanical system to respond to the rates of unbalance met in practice. In the practical embodiments which have been built in accordance with this invention the motors have a very small inertia and drive very light recording and rebalancing mechanisms, while the control equipment is of sufficient capacity to very rapidly accelerate the motors. The result is that the mechanical acceleration is more rapid than the rates of unbalance met in practice and since overshooting is substantially eliminated, the speed of the motors is for all practical purposes always proportional to voltage $E$ as expressed in Equation 6.

Figure 2:
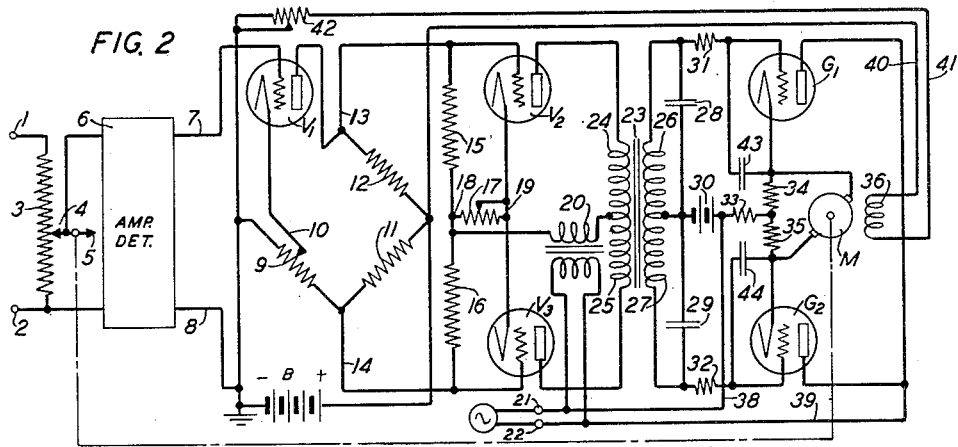

Fig. 2 is essentially identical to Fig. 1 except for the fact that only one motor armature is employed instead of two. Resistors 34 and 35 are inserted in the cathode return circuits of tubes $G_1$ and $G_2$ in place of the two motor armatures. Condensers 43 and 44 in the grid-cathode circuits of tubes $G_1$ and $G_2$, although not shown in Fig. 1, could have been used there equally well. These condensers are not absolutely essential but do aid somewhat in maintaining stability to prevent the tubes from firing from extraneous transient currents. They must not, however, be so large in capacity as to slow down appreciably the response of these tubes to a normal departure from balance. The small direct current motor armature M is connected to the two cathodes as shown and with resistors 34 and 35 constitutes the load in the output circuit of tubes $G_1$ and $G_2$. When tube $G_1$ is firing, the voltage drop across resistor 34 furnishes current for the armature of motor M which upon every positive half cycle flows from the cathode of tube $G_1$ down through the armature of motor M to the cathode of tube $G_2$ and back through resistor 35. When tube $G_2$ fires, the voltage drop across resistor 35 causes current to flow through motor armature M in the opposite direction.

Figure 7:
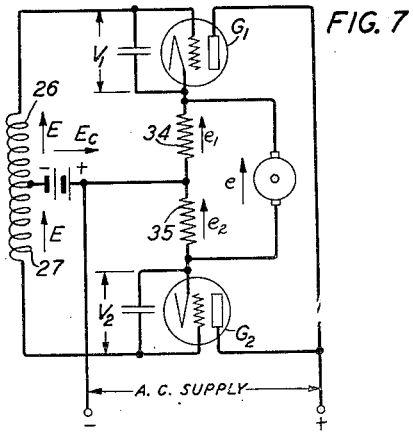

The circuits of Fig. 2 and Fig. 7 operate in essentially the same manner as that above described for Fig. 1. It is only necessary to remember that the armatures of motors $M_1$ and $M_2$ of Fig. 1 are mounted on the same common shaft and that in order for them to urge their shaft in opposite directions, depending upon whether tube $G_1$ or $G_2$ fires, they are inherently so connected that their counter-E. M. F.'s are in the same direction for a given direction of rotation. Although the inertia is materially reduced in Fig. 2 where only one armature is used, the speed of response is not greatly altered because the accelerating voltage available for motor M and the counter-E. M. F.'s available for control purposes are reduced by the presence of resistors 34 and 35. Except for the above-noted effects of resistors 34 and 35, the analysis given above for Fig. 6 applies equally well to the circuit of Fig. 7 so that a detailed description of Fig. 7 is believed unnecessary.

Figure 4:
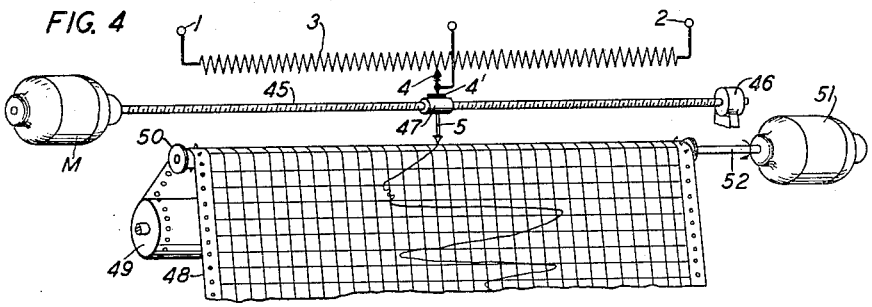
Fig. 4 shows more in detail another specific form of motive means for Fig. 2.

Fig. 4 discloses one specific form of mechanical linkage, linking motor M with slider 4 and stylus 5. Motor M rotates screw 45 which may be supported on the one end by the bearings of motor M and on the other end by bearing 46. Rotation of screw 45 causes block 47 to travel in one direction or the other along the length of the screw depending upon the direction of rotation of the screw. Stylus 5 is mounted directly to block 47 while slider 4 is insulated electrically therefrom by insulator 4'. A suitable chart 48 is carried into engagement with stylus 5 whereupon the path of the stylus is traced on the chart. Chart 48 may be driven by a sprocket 50 mounted on shaft 52 and driven by a gear reduction synchronous motor 51. Supply roll 4 may be suitably supported in any well-known manner. While a specific disclosure of one form of chart drive has been made for the sake of completeness of disclosure, it is apparent that any of the well-known forms may be employed.

Figure 3:
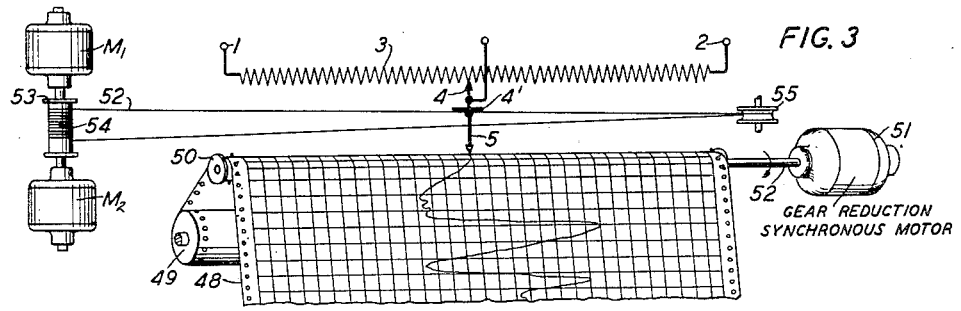
Fig. 3 shows more in detail a specific form of motive means for Fig. 1.

Fig. 3 differs from Fig. 4 only in the form of mechanical linkage and in the fact that two motors $M_1$ and $M_2$ are employed. It is obvious, however, that only one motor, operated in accordance with the control circuits of Fig. 2, would function equally well for this type of mechanical linkage. Cable 52 is given several wraps around arbor 53, which mechanically interconnects the shafts of motors $M_1$ and $M_2$, and is secured thereto at one point 54 to prevent slippage. One end of cable 52 is then passed around idler pulley 55 and the two ends secured to insulator block 4' and stylus 5.

In actual practice suitable mechanical guide tracks must be employed to confine the direction of travel of stylus 5 and slider 4 to a straight line. These tracks have been deleted in these figures for the sake of clarity but any of the forms of guide tracks well known in the recorder art may be employed.

Figure 5:
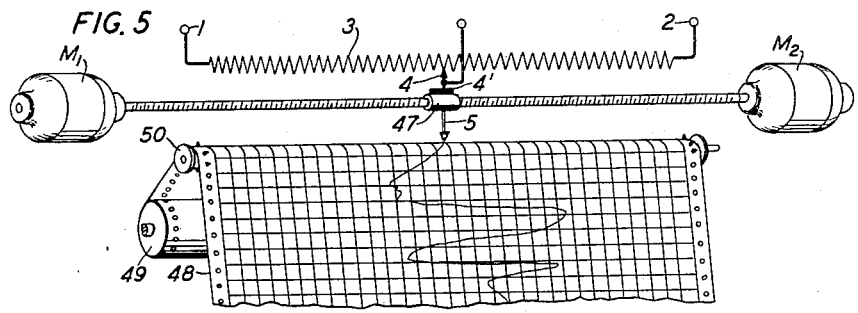
Fig. 5 is a modification of Fig. 3 and the substantial mechanical equivalent thereof.

Fig. 5 is essentially the same as Fig. 4 except that two motors are employed in accordance with the control circuits of Fig. 1. The description otherwise relating to Fig. 4 applies equally well here.

While in Figs. 3 to 5, inclusive, the motive means have been variously shown as either one or two motors, each having separate frames and fields, it is well known that a single frame physically appearing as one motor, as in Fig. 4, may actually contain two armatures operating in separate fields or in a common field. Such a motor would appear physically as in Fig. 4 while its circuits would be electrically identical with Fig. 1.

Figure 8:
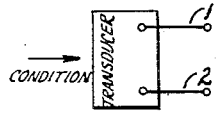
Fig. 8 discloses schematically a transducer means adapted to convert a non-electrical condition to be measured into an electric voltage of proportional magnitude.

Fig. 8 shows in schematic form a transducer capable of transforming a non-electrical physical condition, the magnitude whereof is to be measured, into an electric voltage of corresponding magnitude. Two such transducers are shown in United States Patent 1,495,429, issued May 27, 1924, to A. M. Nicolson, and United States Patent 1,273,627, issued July 23, 1918, to I. Langmuir. Transducers for converting the magnitude of most any physical condition such as temperature, pressure, position, humidity, velocity, etc., into a voltage of proportional magnitude are so well known to the art that further reference thereto is wholly unnecessary.

What is claimed is:

1. In a recorder, the combination comprising a normally balanced electrical network of the Wheatstone bridge type, means for unbalancing said network, means for rebalancing said network including a reversible electromechanical motive means, and an electronic control means for controlling the speed and direction of motion of said motive means as a monotonically increasing function of the magnitude of unbalance, said electronic control means comprising in part two electron discharge devices, each having at least an anode, a cathode and a control electrode, means including said motive means for electrically connecting said cathodes together, connecting means including means electrically associated with said network for connecting said grids to their respective cathodes via said motive means whereby said electronic control means is jointly responsive to the direction and speed of said motive means and the unbalance of said network.

2. In a recorder, the combination comprising a normally balanced electrical network of the Wheatstone bridge type, means for unbalancing said network, means for rebalancing said network including a reversible electromechanical motive means, and an electronic control means jointly responsive to the speed and direction of said motive means and the unbalance of said network, said control means including two grid-controlled gas-filled electron discharge tubes each having an input circuit and an output circuit including a load, each of said input circuits also including the load of its associated output circuit as a part thereof, and means including said motive means for electrically connecting said two output circuits together.

3. In a recorder, the combination comprising a normally balanced electrical network of the Wheatstone bridge type, means for unbalancing said network, means for rebalancing said network including a reversible motive means, and an electronic control means therefor including two electron discharge devices each containing a cathode as a part thereof, said motive means comprising at least one separately excited electric motor having armature means connected in the cathode return circuits of the two electron discharge devices.

4. In a recorder, the combination comprising a normally balanced electrical network of the Wheatstone bridge type, means for unbalancing said network, means for rebalancing said network including a reversible motive means, an electronic control means therefor including two electron discharge devices each having an input and an output circuit and a cathode return circuit common to both of said circuits, said motive means comprising at least one separately excited electric motor having armature means connected in the cathode return circuits of the two electron discharge devices, said return circuits also having a portion in common with their individual input and output circuits.

5. In a recorder, the combination comprising a normally balanced electrical network of the Wheatstone bridge type, means for unbalancing said network, means for rebalancing said network including a reversible motive means, an electronic control means therefor including two electron discharge devices of the grid-controlled gas-filled type each having an input and an output circuit and a cathode return circuit common to both of said circuits, at least one separately excited electric motor having armature means connected to form an integral part of the cathode return circuits of both of said devices, said return circuits also having a portion in common with their individual input and output circuits and other portions in common with both the input and output circuits of each of said devices, and means connecting said input circuits to said normally balanced network whereby said electronic control means is rendered jointly responsive to the speed and direction of said motive means and the unbalance of said network for controlling the speed and direction of motion of said motive means as a monotonically increasing function of the said magnitude of unbalance.

6. In a recorder, the combination comprising a normally balanced electrical network of the Wheatstone bridge type, means for unbalancing said network, means for rebalancing said network including a reversible motive means, an electronic control means therefor including two electron discharge devices each having an input and an output circuit, said motive means comprising a separately excited electric motor the armature whereof is connected in a circuit common to both of said input and both of said output circuits and adapted to generate a counter-E. M. F. proportional to its speed, and means connecting said input circuit to said normally balanced network whereby said electronic control means is rendered jointly responsive to the speed and direction of said motive means and the unbalance of said network for controlling the speed and direction of motion of said motive means as a monotonically increasing function of the magnitude of unbalance.

7. In a recorder, the combination comprising a normally balanced electrical network, means for unbalancing net network, means for rebalancing said network including a reversible motive means, an electronic control means therefor including two electron discharge devices each having an input and an output circuit, said motive means comprising two separately excited electric motors the armatures whereof are serially connected and interposed between the cathodes of said two discharge devices, means connecting the input circuits of each of said devices to the junction between said two armatures, said last-named means including a means electrically associated with said normally balanced network whereby said electronic control means is rendered jointly responsive to the speed and direction of said motive means and the unbalance of said network for controlling the speed and direction of motion of said motive means as a monotonically increasing function of the magnitude of unbalance.

8. In a recorder, the combination comprising a normally balanced electrical network, an output circuit therefor, means for unbalancing said network, means for rebalancing said network, said rebalancing means comprising two motors mounted on a common shaft, each electrically connected to individually rotate said shaft in opposition to the other, and electronic means jointly responsive to the counter- E. M. F. generated by said two motors and the unbalance of said network for controlling the speed and direction of motion of said shaft as a monotonically increasing function of the magnitude of unbalance of said network.

9. An apparatus for automatically rebalancing an unbalanced electrical network capable of unbalance in either of two directions comprising an adjustable element adapted to rebalance said network, an output circuit for said network, means responsive to said output circuit for operating said adjustable element, said means comprising in effect two motor armatures mounted on a common shaft electrically connected to individually rotate said shaft in opposite directions and mechanically linked to said adjustable element, an electron discharge device for each armature, an input and output circuit for each of said devices, each armature connected in common with the input and output circuits of its related electron discharge device, means individual to the input circuits of each of said devices adapted to cause one of said devices to be responsive to the magnitude and one direction of unbalance and the other of said devices to be responsive to the magnitude and opposite direction of unbalance.

10. In a recorder, the combination comprising a normally balanced electrical network, means for unbalancing said network, means for rebalancing said network including a reversible electromechanical motive means, an electron control means therefor jointly responsive to the speed and direction of the motive means and the degree of unbalance of the network, said control means comprising two grid-controlled electron discharge tubes each having an input circuit and an output circuit including a load, each of the input circuits also including the load of its associated output circuit as a part thereof, means including the motive means for electrically connecting the two output circuits together, a plate for each tube and means connecting both plates together and to a common source of electric energy.

WINTHROP J. MEANS.
THADDEUS SLONCZEWSKI.